(12) United States Patent
Buckley

(10) Patent No.: US 12,050,489 B2
(45) Date of Patent: *Jul. 30, 2024

(54) VIRTUAL REALITY VIEWER AND INPUT MECHANISM

(71) Applicant: DDC TECHNOLOGY, LLC, Austin, TX (US)

(72) Inventor: Patrick Buckley, Mill Valley, CA (US)

(73) Assignee: DDC TECHNOLOGY, LLC, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/880,808

(22) Filed: Aug. 4, 2022

(65) Prior Publication Data
US 2022/0374041 A1 Nov. 24, 2022

Related U.S. Application Data

(63) Continuation of application No. 17/383,006, filed on Jul. 22, 2021, now Pat. No. 11,449,099, which is a
(Continued)

(51) Int. Cl.
*G06F 1/16* (2006.01)
*G02B 7/02* (2021.01)
(Continued)

(52) U.S. Cl.
CPC ............. *G06F 1/163* (2013.01); *G02B 7/021* (2013.01); *G02B 27/017* (2013.01);
(Continued)

(58) Field of Classification Search
CPC .................................. G02B 24/01–2027/0198
See application file for complete search history.

(56) References Cited

U.S. PATENT DOCUMENTS

| 2,789,460 A | 4/1957 | Kaufman |
| 5,877,459 A | 3/1999 | Prater |

(Continued)

FOREIGN PATENT DOCUMENTS

| CN | 110140100 B | 2/2020 |
| WO | WO 2015/126987 A1 | 8/2015 |
| WO | WO 2018/126281 A1 | 7/2018 |

OTHER PUBLICATIONS

Brewster, Signe "Why Google Cardboard is Actually a Huge Boost for Virtual Reality" Gigaom.com; Jun. 28, 2014.
(Continued)

*Primary Examiner* — Michael Pervan

(57) ABSTRACT

The present invention concerns virtual reality viewers for use with touchscreen enabled mobile devices. The virtual reality viewer comprises: a housing configured to receive a mobile electronic device within an interior of the housing; and an input mechanism that is accessible from an exterior of the housing and that is moveable within the interior between a first position and an extended position, wherein a surface of the input mechanism is configured to contact the touch-screen of the mobile electronic device when in the extended position. The disclosed systems and methods facilitate receiving user inputs on the exterior of the housing and providing the user inputs to the touchscreen within the housing using the electro-mechanical input mechanism. Accordingly, the viewer can be used with a variety of smartphones without requiring magnetic switches or a wireless/cable connection between the input device and the smartphone.

1 Claim, 10 Drawing Sheets

Related U.S. Application Data continuation of application No. 17/214,074, filed on Mar. 26, 2021, now Pat. No. 11,093,001, which is a continuation of application No. 16/723,769, filed on Dec. 20, 2019, now Pat. No. 11,093,000, which is a continuation of application No. 15/726,079, filed on Oct. 5, 2017, now Pat. No. 10,528,199, which is a continuation of application No. 15/448,785, filed on Mar. 3, 2017, now Pat. No. 9,811,184, which is a continuation of application No. 15/209,397, filed on Jul. 13, 2016, now Pat. No. 9,723,117, which is a continuation of application No. 14/801,606, filed on Jul. 16, 2015, now Pat. No. 9,420,075.

(60) Provisional application No. 62/161,857, filed on May 14, 2015, provisional application No. 62/025,376, filed on Jul. 16, 2014.

(51) Int. Cl.

| | | |
|---|---|---|
| *G02B 27/01* | (2006.01) | |
| *G02B 30/34* | (2020.01) | |
| *G06F 3/01* | (2006.01) | |
| *G06F 3/0354* | (2013.01) | |
| *G06F 3/038* | (2013.01) | |
| *G06F 3/041* | (2006.01) | |
| *G06F 3/044* | (2006.01) | |
| *G06T 19/00* | (2011.01) | |
| *H04M 1/02* | (2006.01) | |
| *H04M 1/04* | (2006.01) | |
| *H04M 1/05* | (2006.01) | |
| *H04M 1/21* | (2006.01) | |

(52) U.S. Cl.
CPC ......... *G02B 27/0176* (2013.01); *G02B 30/34* (2020.01); *G06F 3/011* (2013.01); *G06F 3/017* (2013.01); *G06F 3/03547* (2013.01); *G06F 3/038* (2013.01); *G06F 3/041* (2013.01); *G06F 3/0447* (2019.05); *G06T 19/006* (2013.01); *H04M 1/0266* (2013.01); *H04M 1/04* (2013.01); *H04M 1/05* (2013.01); *H04M 1/21* (2013.01); *G02B 2027/0178* (2013.01)

(56) References Cited

U.S. PATENT DOCUMENTS

| | | | |
|---|---|---|---|
| 8,957,835 | B2 | 2/2015 | Hoellwarth |
| 9,176,325 | B2 | 11/2015 | Lyons |
| D750,074 | S | 2/2016 | Coz |
| D751,072 | S | 3/2016 | Lyons |
| 9,274,340 | B2 | 3/2016 | Lyons |
| D755,789 | S | 5/2016 | Lyons |
| 9,377,626 | B2 | 6/2016 | Lyons |
| D760,701 | S | 7/2016 | Lyons |
| 9,405,126 | B1 | 8/2016 | Margolin |
| 9,420,075 | B2 | 8/2016 | Buckley |
| 9,423,827 | B2 | 8/2016 | Compton |
| 9,599,824 | B2 | 3/2017 | Lyons |
| 9,696,553 | B2 | 7/2017 | Lyons |
| 9,723,117 | B2 | 8/2017 | Buckley |
| 9,811,184 | B2 | 11/2017 | Buckley |
| 10,228,773 | B2 | 3/2019 | Lyons |
| 10,302,951 | B2 | 5/2019 | Lyons |
| D870,822 | S | 12/2019 | Lyons |
| 10,528,199 | B2 | 1/2020 | Buckley |
| 11,093,000 | B2 | 8/2021 | Buckley |
| 11,093,001 | B1 | 8/2021 | Buckley |
| 2009/0046141 | A1 | 2/2009 | Nojiri et al. |
| 2010/0079356 | A1 | 4/2010 | Hoellwarth |
| 2010/0277575 | A1 | 11/2010 | Ismael et al. |
| 2010/0309130 | A1 | 12/2010 | Zhao et al. |
| 2011/0162894 | A1 | 7/2011 | Weber |
| 2011/0164000 | A1 | 7/2011 | Pance |
| 2012/0026298 | A1 | 2/2012 | Filo et al. |
| 2012/0128995 | A1 | 5/2012 | Leto et al. |
| 2012/0139879 | A1 | 6/2012 | Kim |
| 2012/0146957 | A1 | 6/2012 | Dunagan |
| 2013/0002606 | A1 | 1/2013 | Mann |
| 2013/0141360 | A1 | 6/2013 | Compton et al. |
| 2013/0249870 | A1 | 9/2013 | Slaby et al. |
| 2014/0104692 | A1 | 4/2014 | Bickerstaff et al. |
| 2014/0152531 | A1 | 6/2014 | Murray et al. |
| 2014/0247246 | A1 | 9/2014 | Maus |
| 2014/0375531 | A1 | 12/2014 | Latypov |
| 2015/0194131 | A1 | 7/2015 | Kim et al. |
| 2015/0234189 | A1* | 8/2015 | Lyons .................. G02B 27/017 345/174 |
| 2015/0234193 | A1 | 8/2015 | Lyons |
| 2015/0234501 | A1 | 8/2015 | Lyons |
| 2015/0235426 | A1 | 8/2015 | Lyons |
| 2015/0339468 | A1 | 11/2015 | Son |
| 2015/0348327 | A1 | 12/2015 | Zalewski |
| 2015/0364113 | A1 | 12/2015 | Ahn |
| 2016/0054802 | A1 | 2/2016 | Dickerson |
| 2016/0055680 | A1 | 2/2016 | Kim |
| 2016/0062514 | A1 | 3/2016 | Jo |
| 2016/0063767 | A1 | 3/2016 | Lee |
| 2016/0063919 | A1 | 3/2016 | Ha |
| 2016/0066295 | A1 | 3/2016 | Han |
| 2016/0084647 | A1 | 3/2016 | Lee |
| 2016/0086386 | A1 | 3/2016 | Son |
| 2016/0142703 | A1 | 5/2016 | Park |
| 2016/0154494 | A1 | 6/2016 | Kim |
| 2016/0180591 | A1 | 6/2016 | Shiu |
| 2016/0224176 | A1 | 8/2016 | Kim |
| 2016/0232879 | A1 | 8/2016 | Han |
| 2016/0238851 | A1 | 8/2016 | Jeong |
| 2016/0255748 | A1 | 9/2016 | Kim |
| 2016/0262608 | A1 | 9/2016 | Krueger |
| 2017/0123217 | A1 | 4/2017 | Dukerschein et al. |
| 2017/0132845 | A1 | 5/2017 | Everman, II |
| 2017/0269733 | A1 | 9/2017 | Buckley |
| 2018/0292665 | A1 | 10/2018 | Al Zaydi et al. |
| 2018/0292666 | A1 | 10/2018 | Kong |
| 2019/0155405 | A1 | 5/2019 | Lyons |
| 2019/0265488 | A1 | 8/2019 | Lyons |
| 2019/0371071 | A1 | 12/2019 | Lyons |
| 2020/0020024 | A1 | 1/2020 | Lyons |
| 2020/0021668 | A1 | 1/2020 | Lyons |
| 2021/0349495 | A1 | 11/2021 | Buckley |

OTHER PUBLICATIONS

Comments on: Why Google Cardboard is actually a huge boost for virtual reality Internet Archive; https://web.archive.org/web/20140715204200/hllps://gigaom.com/2014/06/28/why-google-cardboard-is-actually-a- huge-booslfor-virtual-reality/feed/ ; Jul. 5, 2014.

Declaration and CV of Kurtis P. Keller; Provided in Inter Partes Review for IPR 2018-00494, produced Oct. 8, 2019.

Declaration and CV of Kyle B. Fleming in Support of Unopposed Motion for Pro Hace Vice Admission; Provided in Inter Partes Review for IPR 2018-00494, produced Oct. 8, 2019.

Declaration of YouTube LLC in Response to Feb. 7, 2019 Subpoena from MerchSource LLC in matters PGR 2018-00019; PGR 2018-00020; and IPR 2018-00494; Mar. 7, 2019.

Dunn, Will "How to Make Google Cardboard from Scratch" Available at https://www.stuff.tv/features/how-make-google-cardboard-scratch; Jul. 5, 2014.

Pace, Tony "Google Cardboard DIY Guide" Hacklab Taiching; Jul. 1, 2014.

Transcript of Phone Conference Before the Patent Trial and Appeal Board; *Merchsource LLC v. Dodcase, Inc.*; IPR 2018-00494; PGR 2018-00019; nad PGR 2018-0020; Sep. 20, 2018.

Transcript of Phone Conference Before the Patent Trial and Appeal Board; *Merchsource LLC v. Dodcase, Inc.*; IPR 2018-00494; PGR 2018-00019; nad PGR 2018-0020; Jan. 4, 2019.

(56) References Cited

OTHER PUBLICATIONS

Video—YouTube Video—GoogleDevelopers, "Google I/O 2014—Cardboard: VR for Android" YouTube; https://www.youtube.com/watch?v=DFog2gMnm44&t=2s; Jun. 27, 2014.
Video—YouTube Video of "Hands-On with Google Cardboard Virtual Reality Kit," YouTube Video, <https://www.youtube.com/watch?v=eT9vmpE8WcY>, Jun. 30, 2014.
Video—YouTube Video of Let's Get Retro "Adding a capacitive lever to a google cardboard 1 (on the cheap),"; available at https://www.youtube.com/watch?v=kgJpRtnqQPQ; Jul. 6, 2015.
Video and Declaration of Prince Aryajeet Milind Ramteke—YouTube Video of Prince Ramteke, "Use Google Cardboard Without Magnetometer (Enabling Magnetic Ring Support To Every Device" Youtube; Available at https://www.youtube.com/watch?v=o_Pk_kipYto; May 10, 2015.
Virtual Reality—Gigaom Search; Available at https://web.archive.org/web/20140701160607/http://search.gigaom.com/tag/virtual-reality/; Jul. 1, 2014.
Official Action for U.S. Appl. No. 14/801,606, mailed Oct. 23, 2015.
Notice of Allowance for U.S. Appl. No. 14/801,606, mailed Apr. 6, 2016.
Official Action for U.S. Appl. No. 15/209,397, mailed Sep. 2, 2016.
Official Action for U.S. Appl. No. 15/209,397, mailed Apr. 21, 2017.
Notice of Allowance for U.S. Appl. No. 15/209,397, mailed Jun. 9, 2017.
Official Action for U.S. Appl. No. 15/448,785, mailed Apr. 21, 2017.
Notice of Allowance for U.S. Appl. No. 15/448,785, mailed Jul. 7, 2017.
Official Action for U.S. Appl. No. 15/726,079, mailed Feb. 8, 2018.
Official Action for U.S. Appl. No. 15/726,079, dated Nov. 30, 2018.
Official Action for U.S. Appl. No. 15/726,079, mailed Mar. 8, 2019.
Notice of Allowance for U.S. Appl. No. 15/726,079, mailed Aug. 21, 2019.
Corrected Notice of Allowance for U.S. Appl. No. 15/726,079, mailed Oct. 25, 2019.
Office Action for U.S. Appl. No. 16/723,769, mailed Jul. 22, 2020.
Office Action for U.S. Appl. No. 16/723,769, mailed May 4, 2021.
Notice of Allowance for U.S. Appl. No. 16/723,769, mailed Jun. 1, 2021.
Office Action for U.S. Appl. No. 17/214,074, mailed May 25, 2021.
Notice of Allowance for U.S. Appl. No. 17/214,074, mailed Jul. 2, 2021.
Office Action for U.S. Appl. No. 17/383,006, mailed Mar. 9, 2022.
Notice of Allowance for U.S. Appl. No. 17/383,006, mailed Jun. 20, 2022.
Petition for Inter Partes Review of U.S. Pat. No. 9,420,075, including Exhibits 1001-1022; Case No. IPR2018-00494, filed Jan. 15, 2018 (677 pages).
Documents filed with *Merchsource, LLC v. Dodocase, Inc.*; United States Patent and Trademark Office—Before the Patent Trial and Appeal Board, Case No. IPR 2018-00494; Filed between Jan. 26, 2018-May 9, 2018 (43 pages).
Dodocase VR, Inc.'s Patent Owner Preliminary Response Pursuant To 37 C.F.R. § 42.107(a) for *Merchsource, LLC v. Dodocase, Inc.*; United States Patent and Trademark Office—Before the Patent Trial and Appeal Board, Case No. IPR 2018-00494; Filed May 25, 2018 (97 pages).
Decision Institution of Inter Partes Review 35 U.S.C. § 314(a) for *Merchsource, LLC v. Dodocase, Inc.*; United States Patent and Trademark Office—Before the Patent Trial and Appeal Board, Case No. IPR 2018-00494; Filed Aug. 22, 2018 (31 pages).
Documents filed with *Merchsource, LLC v, Dodocase, Inc.*; United States Patent and Trademark Office—Before the Patent Trial and Appeal Board, Case No. IPR 2018-00494; Filed between Sep. 4, 2018-Dec. 17, 2018 (126 pages).
Patent Owner's Response To Petition Pursuant To 37 C.F.R § 42.107(a) for *Merchsource, LLC v. Dodocase, Inc.*; United States Patent and Trademark Office—Before the Patent Trial and Appeal Board, Case No. IPR 2018-00494; Filed Dec. 17, 2018 (454 pages).
Documents filed with *Merchsource, LLC v. Dodocase, Inc.*; United States Patent and Trademark Office—Before the Patent Trial and Appeal Board, Case No. IPR 2018-00494; Filed between Jan. 2, 2019-Jan. 29, 2019 (79 pages).
Petitioner's Reply for *Merchsource, LLC v. Dodocase, Inc.*; United States Patent and Trademark Office—Before the Patent Trial and Appeal Board, Case No. IPR 2018-00494; Filed Mar. 18, 2019 (133 pages).
Patent Owner's Sur-Reply To Petitioner's Reply for *Merchsource, LLC v. Dodocase, Inc.*; United States Patent and Trademark Office—Before the Patent Trial and Appeal Board, Case No. IPR 2018-00494; Filed Mar. 25, 2019 (128 pages).
Documents filed with *Merchsource, LLC v. Dodocase, Inc.*; United States Patent and Trademark Office—Before the Patent Trial and Appeal Board, Case No. IPR 2018-00494; Filed between Mar. 25, 2019-May 9, 2019 (19 pages).
Compelled Motion in Compliance With Court Order for *Merchsource, LLC v. Dodocase, Inc.*; United States Patent and Trademark Office—Before the Patent Trial and Appeal Board, Case No. IPR 2018-00494; Filed Jul. 30, 2019 (47 pages).
Order Granting Petitioner's Compelled Motion in Compliance with Court Order 37 C.F.R. 42.72 filed with *Merchsource, LLC v. Dodocase, Inc.*; United States Patent and Trademark Office—Before the Patent Trial and Appeal Board, Case No. IPR 2018-00494; Filed on Aug. 16, 2019 (3 pages).
Petition for Post Grant Review of U.S. Pat. No. 9,723,117, including Exhibits 1001-1023; Case No. PGR 2018-00019, filed Jan. 15, 2018 (872 pages).
Documents filed with *Merchsource, LLC v. Dodocase, Inc.*; United States Patent and Trademark Office—Before the Patent Trial and Appeal Board, Case No. PGR 2018-00019; Filed between Jan. 22, 2018-May 18, 2018 (35 pages).
Dodocase VR, Inc.'s Patent Owner Preliminary Response Pursuant To 37 C.F.R. § 42.107(a) for *Merchsource, LLC v. Dodocase, Inc.*; United States Patent and Trademark Office—Before the Patent Trial and Appeal Board, Case No. PGR 2018-00019; Filed May 25, 2018 (97 pages).
Decision Institution of Post Grant Review 35 U.S.C. § 324(a) for *Merchsource, LLC v. Dodocase, Inc.*; United States Patent and Trademark Office—Before the Patent Trial and Appeal Board, Case No. PGR 2018-00019; Filed Aug. 22, 2018 (30 pages).
Documents filed with *Merchsource, LLC v. Dodocase, Inc.*; United States Patent and Trademark Office—Before the Patent Trial and Appeal Board, Case No. PGR 2018-00019; Filed between Sep. 4, 2018-Dec. 17, 2018 (129 pages).
Patent Owner's Response To Petition Pursuant To 37 C.F.R. § 42.107(a) for *Merchsource, LLC v. Dodocase, Inc.*; United States Patent and Trademark Office—Before the Patent Trial and Appeal Board, Case No. PGR 2018-00019; Filed Dec. 17, 2018 (448 pages).
Documents filed with *Merchsource, LLC v. Dodocase, Inc.*; United States Patent and Trademark Office—Before the Patent Trial and Appeal Board, Case No. PGR 2018-00019; Filed between Jan. 2, 2019-Jan. 29, 2019 (79 pages).
Petitioner's Reply and Petitioner's Opposition To Patent Owner's Motion To Amend for *Merchsource, LLC v. Dodocase, Inc.*; United States Patent and Trademark Office—Before the Patent Trial and Appeal Board, Case No. PGR 2018-00019; Filed Mar. 18, 2019 (152 pages).
Patent Owner's Reply To Petitioners' Opposition To Motion To Amend; Patent Owner's Sur-Reply To Petitioner's Reply; and Patent Owner's Objections To Evidence Submitted With Petitioner's Reply for *Merchsource, LLC v. Dodocase, Inc.*; United States Patent and Trademark Office—Before the Patent Trial and Appeal Board, Case No. PGR 2018-00019; Filed Mar. 25, 2019 (152 pages).
Documents filed with *Merchsource, LLC v. Dodocase, Inc.*; United States Patent and Trademark Office—Before the Patent Trial and Appeal Board, Case No. PGR 2018-00019; Filed between Apr. 24, 2019-May 9, 2019 (15 pages).
Compelled Motion in Compliance With Court Order for *Merchsource, LLC v. Dodocase, Inc.*; United States Patent and Trademark Office—

(56) References Cited

OTHER PUBLICATIONS

Before the Patent Trial and Appeal Board, Case No. PGR 2018-00019; Filed Jul. 30, 2019 (47 pages).
Order Granting Petitioner's Compelled Motion in Compliance with Court Order 37 C.F.R. 42.72 for *Merchsource, LLC v. Dodocase, Inc.*; United States Patent and Trademark Office—Before the Patent Trial and Appeal Board, Case No. PGR 2018-00019; Filed Aug. 16, 2019 (3 pages).
Petition for Post Grant Review of U.S. Pat. No. 9,811,184, including Exhibits 1001-1024; Case No. PGR 2018-00020, filed Jan. 15, 2018 (1,008 pages).
Documents filed with *Merchsource, LLC v. Dodocase, Inc.*; United States Patent and Trademark Office—Before the Patent Trial and Appeal Board, Case No. PGR 2018-00020; Filed between Jan. 18, 2018-May 9, 2018 (43 pages).
Dodocase VR, Inc.'s Patent Owner Preliminary Response Pursuant To 37 C.F.R. § 42.107(a) for *Merchsource, LLC v. Dodocase, Inc.*; United States Patent and Trademark Office—Before the Patent Trial and Appeal Board, Case No. PGR 2018-00020; Filed May 25, 2018 (98 pages).
Decision Institution of Post Grant Review 35 U.S.C. § 324(a) for *Merchsource, LLC v. Dodocase, Inc.*; United States Patent and Trademark Office—Before the Patent Trial and Appeal Board, Case No. PGR 2018-00020; Filed Aug. 22, 2018 (29 pages).
Documents filed with *Merchsource, LLC v. Dodocase, Inc.*; United States Patent and Trademark Office—Before the Patent Trial and Appeal Board, Case No. PGR 2018-00020; Filed between Sep. 4, 2018-Dec. 17, 2018 (131 pages).
Patent Owner's Response To Petition Pursuant To 37 C.F.R. § 42.107(a) for *Merchsource, LLC v. Dodocase, Inc.*; United States Patent and Trademark Office—Before the Patent Trial and Appeal Board, Case No. PGR 2018-00020; Filed Dec. 17, 2018 (448 pages).
Documents filed with *Merchsource, LLC v. Dodocase, Inc.*; United States Patent and Trademark Office—Before the Patent Trial and Appeal Board, Case No. PGR 2018-00020; Filed between Jan. 2, 2019-Jan. 29, 2019 (79 pages).
Petitioner's Reply and Petitioner's Opposition To Patent Owner's Motion To Amend for *Merchsource, LLC v. Dodocase, Inc.*; United States Patent and Trademark Office—Before the Patent Trial and Appeal Board, Case No. PGR 2018-00020; Filed Mar. 18, 2019 (153 pages).
Patent Owner's Reply To Petitioners' Opposition To Motion To Amend; Patent Owner's Sur-Reply To Petitioner's Reply; and Patent Owner's Objections To Evidence Submitted With Petitioner's Reply for *Merchsource, LLC v. Dodocase, Inc.*; United States Patent and Trademark Office—Before the Patent Trial and Appeal Board, Case No. PGR 2018-00020; Filed Mar. 25, 2019 (152 pages).
Documents filed with *Merchsource, LLC v. Dodocase, Inc.*; United States Patent and Trademark Office—Before the Patent Trial and Appeal Board, Case No. PGR 2018-00020; Filed between Apr. 24, 2019-May 9, 2019 (15 pages).
Compelled Motion in Compliance With Court Order for *Merchsource, LLC v. Dodocase, Inc.*; United States Patent and Trademark Office—Before the Patent Trial and Appeal Board, Case No. PGR 2018-00020; Filed Jul. 30, 2019 (47 pages).
Order Granting Petitioner's Compelled Motion in Compliance with Court Order 37 C.F.R. 42.72 for *Merchsource, LLC v. Dodocase, Inc.*; United States Patent and Trademark Office—Before the Patent Trial and Appeal Board, Case No. PGR 2018-00020; Filed Aug. 16, 2019 (3 pages).
Documents filed with U.S. District Court Proceedings for *DDC Technology, LLC and Dodocase VR, Inc. v. Merchsource, LLC (dba Sharper Image) and Threesixty Brands Group LLC (dba Sharper Image)* District Court, for the Northern District of California; Civil Action No. 3:17-cv-07088-EDL; Includes publicly available documents filed from Dec. 13, 2017-Oct. 7, 2020; Docket Nos. 1-201; (2,757 pages).
Documents filed with U.S. Court of Appeals for the Federal Circuit for *DDC Technology, LLC and Dodocase VR, Inc. v. Merchsource, LLC (dba Sharper Image) and Threesixty Brands Group LLC (dba Sharper Image)*; Appeal Docket No. 18-1724; Includes publicly available documents filed from Mar. 27, 2018-Jul. 17, 2019; Docket Nos. 1-94; (1878 pages).

* cited by examiner

VIRTUAL REALITY VIEWER AND INPUT MECHANISM

CROSS-REFERENCE TO RELATED APPLICATIONS

This application is a continuation of U.S. patent application Ser. No. 17/383,006, filed Jul. 22, 2021, which is a continuation of U.S. patent application Ser. No. 17/214,074, filed Mar. 26, 2021, now U.S. Pat. No. 11,093,001, which is a Continuation of U.S. patent application Ser. No. 16/723,769, filed Dec. 20, 2019, now U.S. Pat. No. 11,093,000, which is a continuation of U.S. patent application Ser. No. 15/726,079 filed Oct. 5, 2017, now U.S. Pat. No. 10,528,199, which is a continuation of U.S. patent application Ser. No. 15/448,785, filed Mar. 3, 2017, now U.S. Pat. No. 9,811,184, which is a continuation of U.S. patent application Ser. No. 15/209,397, filed Jul. 13, 2016, now U.S. Pat. No. 9,723,117, which is a continuation of U.S. patent application Ser. No. 14/801,606, filed Jul. 16, 2015, now U.S. Pat. No. 9,420,075, which claims priority to U.S. Provisional Application No. 62/161,857, filed May 14, 2015 and to U.S. Provisional Application No. 62/025,376, filed Jul. 16, 2014, each of which are incorporated herein by reference in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

Virtual reality viewers and headsets (collectively referred to as viewers) are becoming an increasingly popular way of viewing digital media, gaming and the like. With the widespread distribution of powerful and capable smartphone devices, many VR viewers are designed to use such smartphone devices as the visual display device, instead of having dedicated displays and electronics.

Typically the viewers have a housing that a user looks into in order to view the video display device contained within the housing. Viewers can be hand-held devices that a user holds up to the users face/eyes, for example, like a user would hold a pair of binoculars. Viewers can also be worn on a user's head, so as to free the user's hands while looking into the viewer.

As would be understood by those in the art, viewers configured to use a smartphone as the visual display device typically receive the smartphone such that the smart phone display is viewable when a user looks into the viewer housing. These viewers also typically include one or more optical lenses within the housing so as to facilitate a three-dimensional viewing experience despite the two-dimensional display of the smartphone. In some instances, the smartphone is completely contained within the housing, in other implementations the smartphone is attached to the housing in a manner such that the display is exposed within the interior of the viewer One challenge to utilizing a smartphone in these types of viewers is that the touch sensitive display is concealed within the viewer housing, thereby making it difficult for a user to interact with the touch sensitive display of the device. To overcome this, some existing VR viewers utilize magnets on the exterior of the viewer as input devices, however one drawback is that the locations of magnetic sensors on smartphones vary from device to device and, as such, these viewers with magnetic inputs are only effectively used with a limited number of devices. Other VR viewers utilize built in accelerometers or other such position/orientation sensors within the smartphone to detect movement or the absence of movement and identify user inputs using the movement data. Other VR viewers utilize dedicated input devices, like video game controllers, that connect to the electronic device within the viewer either by a wired plug like connection (e.g., USB or Apple compatible connector), or a wireless connection capabilities. However, such VR viewer configurations typically require complex electronic circuitry and wireless connectivity capabilities in order to facilitate the capture and transfer of user inputs. Moreover, dedicated input controllers can be cumbersome when used with handheld viewer.

What is needed is a VR viewer having integrated user input devices that is configured for use with a wide variety of conventionally available smartphone devices.

These considerations are addressed by the present invention.

BRIEF SUMMARY OF THE INVENTION

The present invention concerns a virtual reality viewer including an input mechanism that can be used with mobile electronic device having a touchscreen contained within the viewer. According to a first aspect, the virtual reality viewer for use with a mobile electronic device having a touch-screen, comprises: a housing configured to receive a mobile electronic device within an interior of the housing. In addition, the viewer further comprises an input mechanism that is accessible from an exterior of the housing and is moveable within the interior between at least a first position and an extended position, wherein a surface of the input mechanism is configured to contact the touch-screen of the mobile electronic device when in the extended position.

According to another aspect, the virtual reality viewer for use with a mobile electronic device having a touch-screen, comprises: a housing configured to receive a mobile electronic device within an interior of the housing; and an input device including a first portion that is accessible from an exterior of the housing, and a surface within the interior that is configured to contact the touch-screen of the mobile electronic device and transfer a capacitive touch input to the touch-screen in response to a user interaction with the first portion.

These and other aspects, features, steps and advantages can be further appreciated from the accompanying figures and description of certain illustrative embodiments.

DETAILED DESCRIPTION OF THE INVENTION

According to an aspect of the subject application, Virtual reality viewer systems and methods are provided that facilitate the capture of user inputs while using the virtual reality viewer. More specifically, the disclosed systems and methods provide a virtual reality viewer for use with a wide variety of personal electronic devices (e.g., a smartphone) as the visual display device, and having improved tactile user input capabilities.

According to a salient aspect, the disclosed systems and methods facilitate receiving tactile user inputs (e.g., user touches, button depressions etc.) on the exterior of the housing of the viewer and providing the user inputs to the touch sensitive display of the smartphone device that is within the viewer housing. In this manner, the disclosed systems and methods provide a viewer that is configured to be useable with a wide variety of smartphones without requiring input devices that require specifically placed magnetic sensors, wireless or dedicated cable connection to the electronic device 15.

Figure 1:
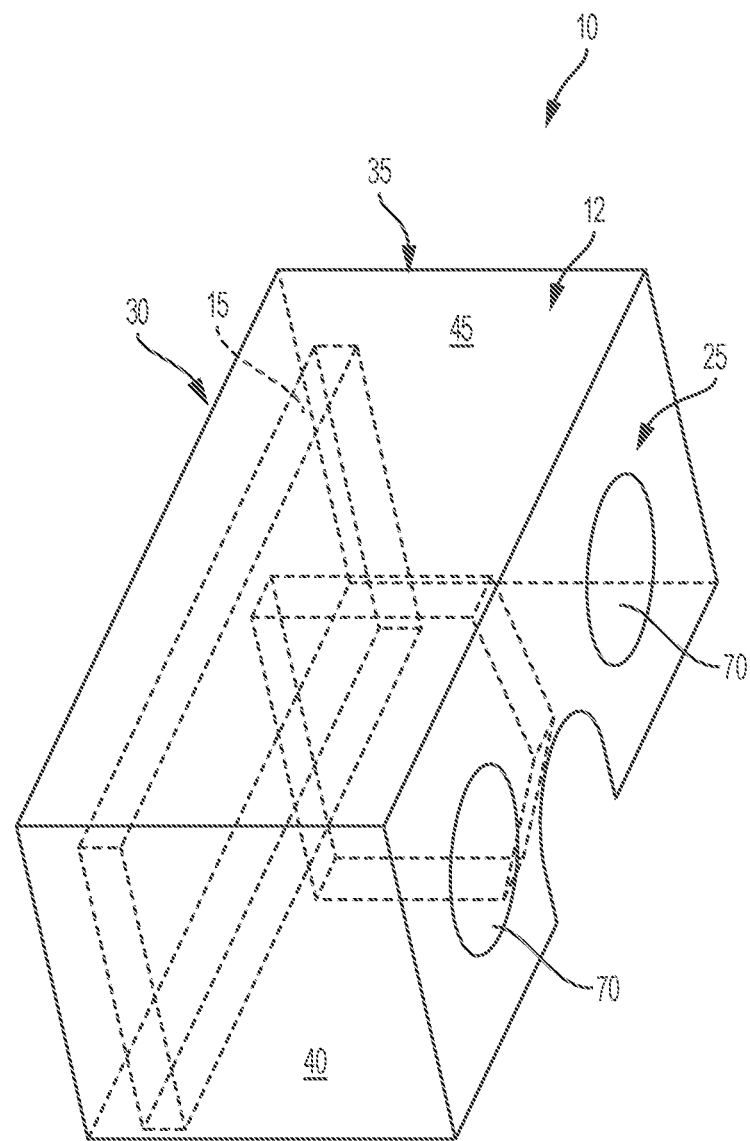
FIG. 1 illustrates an exemplary virtual reality viewer.

In one arrangement, the viewer is provided having a housing that encloses a generally hollow interior. As shown in FIG. 1, which is a perspective view of an exemplary viewer 10 having a conventional construction without an input mechanism. As shown, the viewer comprises a housing 12 that includes a front surface 30 back surface 25, top surface 45, bottom surface 50 (not shown), left surface 40 and right surface 35.

In some implementations, when in operation, housing 12 will be disposed in the position directly in front of the user's eyes such that the lenses contained in the housing, are in alignment with each of the user's eyes and the display of the electronic device is viewable through the lenses. It should be understood that the housing can be held by the user, or worn by the user such that the back surface of the housing is held against or in proximity to the users face.

The housing 12 is configured to receive an electronic device 15 having a touch sensitive display. The electronic device 15 can be any electronic device configured to visually display information via a display (e.g., LED, Plasma, LCD display) and receive user inputs via a touch sensitive user interface (e.g., a capacitive touch sensitive display), as would be understood by those skilled in the art. For example and without limitation, electronic device 15 can include a smartphone or other such personal electronic device having a touch sensitive display, for example, an iPhone or Android smartphone device and the like that are commercially available.

Preferably the electronic device 15 is received or mounted within the interior of the housing 12 such that the electronic device display 17 is viewable when the user is looking through the housing 12. By way of further example, the electronic device 15, can be mounted on the housing such that it defines the back surface of the viewer. It can be appreciated that other configurations for the viewer 10 are envisioned without departing from the scope of the invention.

Figure 2:
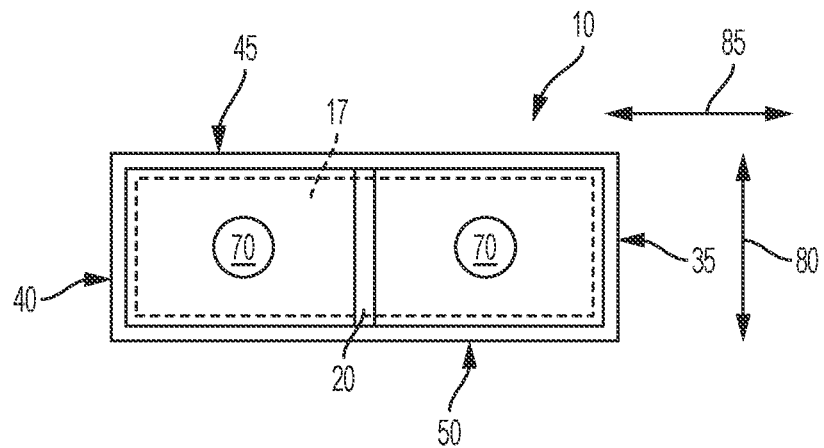
FIG. 2 illustrates the viewer of FIG. 1.
Figure 3:
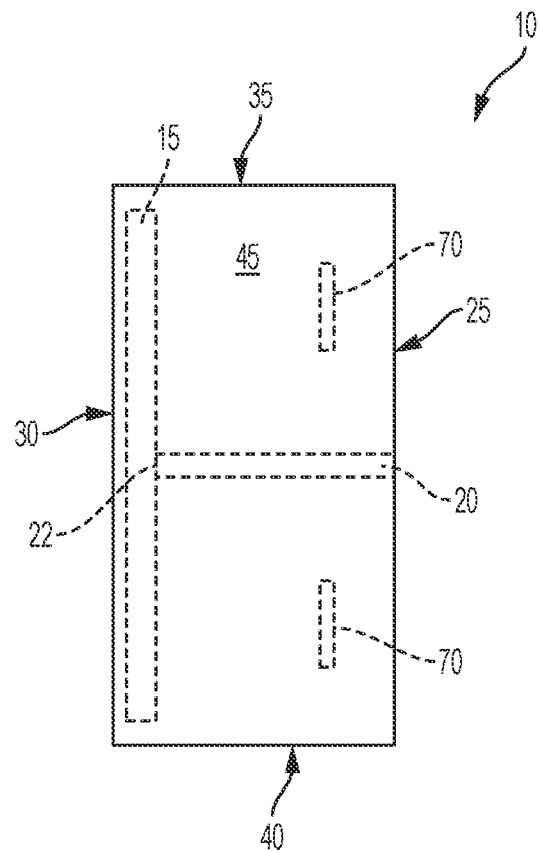
FIG. 3 illustrates the viewer of FIG. 1.

As shown in FIG. 2, which is a back view of the viewer (the terminology back side of refers to the side that the user looks into), preferably the housing 12 is configured to receive the electronic device 15 such that the touch sensitive display 17 of the device 15 is centered in a vertical direction 80 and/or a horizontal direction 85.

As shown in FIGS. 1 and 2, in some implementations, the housing includes one or more lenses 70 disposed therein arranged to be in alignment with the user's eyes when the user looks into the viewer. Generally, lenses 70 are mounted such that light from the display of the electronic device passes through lenses 70 to the user's eyes. The configuration, construction and placement of a lens or lenses 70 for use in virtual reality viewers are generally known and understood by those skilled in the art.

Figure 4:
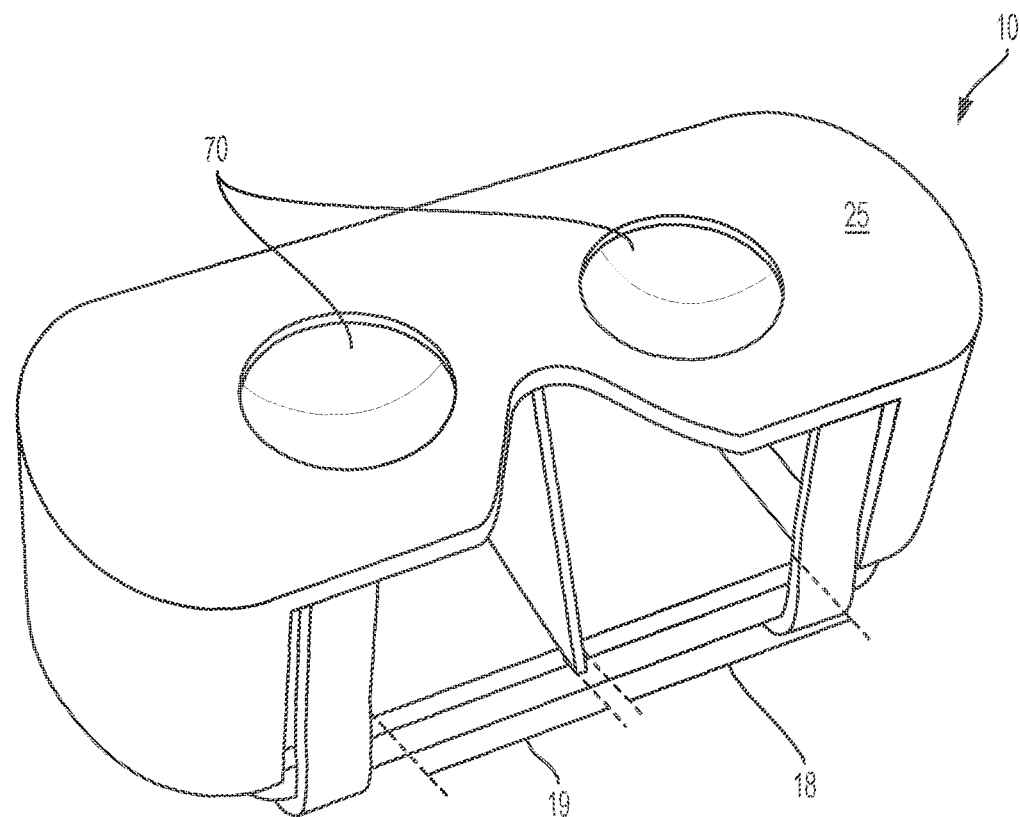
FIG. 4 illustrates an exemplary virtual reality viewer.
Figure 5:
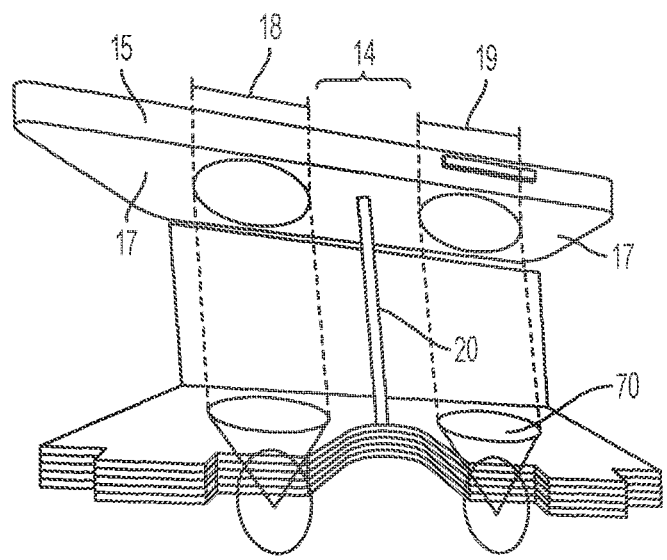
FIG. 5 illustrates an exemplary virtual reality viewer.

A view divider 20 can also be disposed within the housing. FIG. 4 is a perspective view of an exemplary configuration of a viewer 10 without a top, bottom and sides and showing the interior space of the viewer including the view divider 20. FIG. 5 shows a bottom view of the interior of an exemplary viewer 10 including view divider 20 and having the left and right, bottom and front sides removed. Referring to FIG. 5, the view divider 20 is configured to isolate the field of view of the left eye from the right eye. In other words, the view divider serves to obstruct the right eye from seeing or receiving images displayed by the left portion 19 of the display 17 of the electronic device 15 and the left eye from seeing images displayed by the right portion 18 of the display 17. It should also be appreciated that the particular width of the left and right portions of the display that are actually viewable by the user can vary depending on the lenses. In some implementations view dividers are not used.

Between the left and right portion of the display 17 is a central portion 14 of the display. The central portion of the display is not viewable by either the left or right eye due to the view divider 20, and, in addition or alternatively, due to the optical characteristics of the lenses 70. The width of the central portion 14 can range from the width of the view divider 20 but can be larger depending on the optical characteristics of the lenses 70. The central portion 14 that is not viewable by either the left or right eye can also vary in shape depending on the optical characteristics of the lenses. For example, it might be rectangular or an hour glass shape that is wider towards the top and bottom sides of the viewer and narrower in the middle section of the display 17.

In one arrangement, the viewer 10 is configured to include one or more input devices that are configured to receive user inputs at the exterior of the viewer and provide such inputs directly to the touch sensitive display 17. The input devices can be configured to be passive and/or active input devices.

Preferably the inputs are provided to the display at the central portion 14 of the display, however one or more of the user inputs can be provided to the electronic device at alternative portions of the display 17 as well. Because the central portion 14 of the display is not viewable by the left or right eye to, by providing inputs at the central portion 14, the viewer 10 is capable of providing inputs to the electronic device 15 in a manner that does not disturb the field of view of the left or right eye. Moreover, because the device 15 is received within the housing and preferably positioned such that the display 17 portion of the device is generally centered in at least a horizontal direction and often in vertical direction as well, providing inputs in the central portion 14, for example, where the view divider 20 is proximate to the display 17, allows the systems and methods disclosed herein to be useable with a wide variety of touch sensitive smartphone devices of various sizes and screen layouts. Moreover, software can be configured universally to these touch points regardless of the shape or size of the device because of the centered location.

Figure 6A:
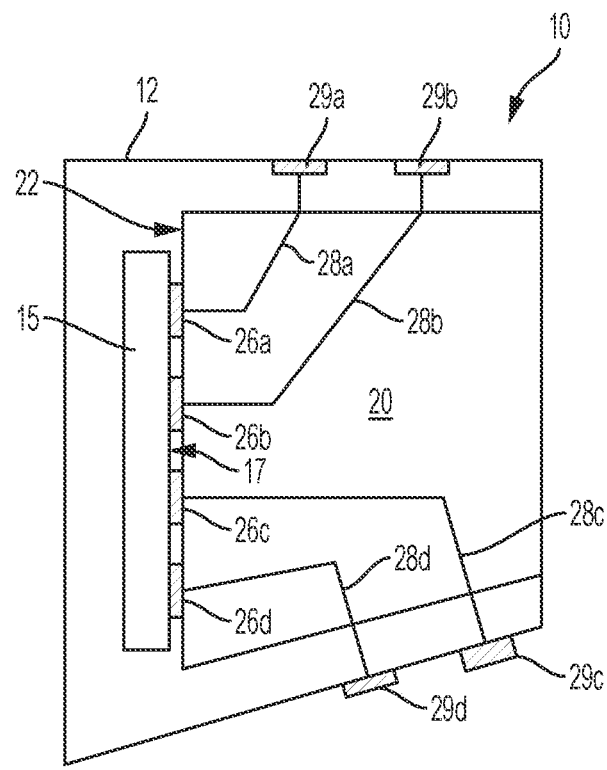
FIG. 6A illustrates an exemplary virtual reality viewer including an input mechanism in accordance with an embodiment of the invention.
Figure 6B:
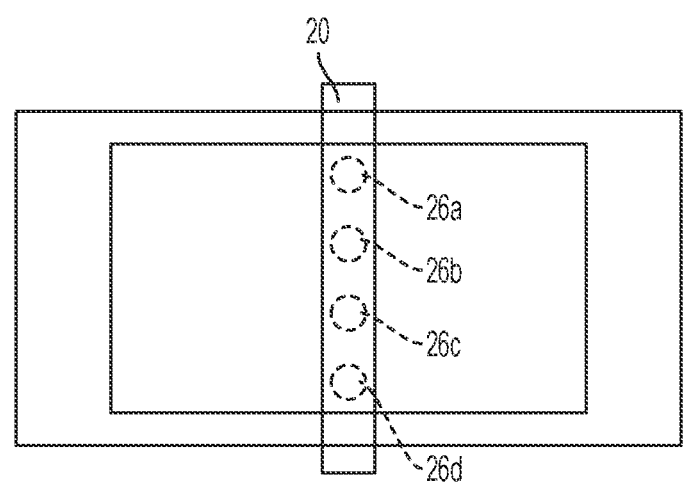
FIG. 6B illustrates the viewer of FIG. 6A.

An exemplary implementation of a viewer including an input mechanism in accordance with an embodiment of the invention is shown in FIG. 6A-6B, which depict a cross-sectional view and of the exemplary viewer 10, including the view divider 20 and the electronic device 15 from the side and back perspective respectively. As shown, the viewer includes input devices that include one or more touchscreen inputs (26a-26d). In this particular exemplary configuration, the touchscreen inputs (26a-26d) are disposed on the distal surface 22 of the view divider 20. Preferably, the electronic device 15 is mounted in a manner such that the touch sensitive display 17 of the device 15, is proximate to (or is touching) at least a portion of the distal surface 22 of the view divider 20, such that the display 17 (not shown from this particular perspective) of the device is in physical contact with the surface of the touchscreen input portion of the input mechanism.

As most smartphones have capacitive torch sensitive displays, in an exemplary implementation, the touchscreen inputs (26a-26d) are constructed from a conductive material, for example, a conductive foam or polymer and the like as are used as the tip of a stylus configured for use with a capacitive touch screen. A compressible material will allow the housing to accommodate devices of varying thicknesses and create a capacitive connection between the display and the touchscreen inputs without the screen touching other portions of the surface 22, for example, to prevent scratching of the screen, provide communicative connection between touchscreen input and the touchscreen without cross-talk and other such considerations.

Preferably, the touchscreen inputs (26a-26d) are electrically coupled to one or more user inputs (29a-29d) that are configured to receive user interactions while using the viewer. Preferably the user inputs (29a-29d) are exposed on the outer surfaces of the housing or positioned on the exterior of the housing 12 such that the user can interact with the user inputs (29a-29d) while using the viewer 10, although other configurations are envisioned without departing from the scope of the invention. The user inputs are configured to sense/detect or receive the user interactions and transmit/transfer/relay the user interaction to the touch sensitive display via the touch screen inputs (26a-26d). In some implementations, the user inputs relay the user interactions to the touch screen inputs (26a-26d) via input leads (28a-28d), respectively. For example and without limitation, input leads can be conductive wires/leads that electrically couple the user inputs (29a-29d) to touchscreen inputs (26a-26d).

In such an exemplary configuration in which the input device is a passive input device, the user inputs (e.g., 29a-29d) are preferably constructed of conductive material, for example, a metalized polymer, conductive polymers, conductive/capacitive inks, carbon based inks or other such inks designed to activate capacitive screens. Accordingly, a user touch of a conductive user input (e.g., 29a), via the conductive lead (e.g., 28a) and touchscreen input (e.g., 26a), will alter the electrical properties of the portion of the display 17 that is in contact with the touchscreen input.

As will be understood by those skilled in the art, the device 15 having a capacitive touch sensitive display 17 can detect the particular location of a change in the electrical property that is caused by the user touch of the user input (e.g., 29a). As would be understood by those skilled in the art, based on the particular location of the sensed change, the device 15, which has a processor executing instructions in the form of code, can interpret that an electrical change sensed at a particular location on the display 17 corresponds to a user interaction with a particular user input and corresponds to a prescribed input instruction, for example, a left mouse click or a right mouse click, or a double click, or as the user moving a cursor, or other such functions. Moreover, it would be understood that other combinations of user interactions sensed by the touch sensitive display can be interpreted as one or more of a number of user inputs such as pushing all 4 buttons at once could represent grabbing a virtual item. The 3 dimensional physical interaction offered by the users hands wrapping around the virtual reality viewer and interacting with the inputs can more easily be translated into 3 dimensional virtual interactions in a more natural way then previous user input mechanisms used today. It should also be understood that the arrangement of the touchscreen inputs the corresponding user inputs and associated functions can be pre-defined in software that is loaded into and executing in the device 15 processor.

Although an exemplary passive input device configuration having 4 distinct user inputs has been disclosed, it can be appreciated that other passive input device configurations are envisioned. For example, an array of user inputs and corresponding touchscreen inputs can be provided. It should also be understood that other active input device configurations can also be implemented in accordance with the disclosed embodiments without departing from the scope of the invention.

Although FIG. 6A shows the user inputs positioned on the top and bottom surfaces of the housing 12 and also shows that the leads run through the view divider 20 and through the top and bottom surfaces of the housing to corresponding user inputs, it can be appreciated that the leads can run through any portions of the housing. It can be further appreciated that any number of the user inputs (29a-29d) can be located on any portion of the housing and in any orientation or configuration. Moreover, it can be further appreciated that any number of touchscreen inputs (e.g., 26a-26d) can be located on the distal end 22 and in any orientation or configuration.

Moreover, although the exemplary configuration provides the user inputs to the screen 17 at the central portion 14 of the display 17 via the view divider 20, other configurations are possible. For example, the viewer can provide such touchscreen inputs (e.g., 26a-26d) on a surface that abuts one or more other portions the display 17.

In accordance with the disclosed embodiments of the invention, the exemplary viewers can be configured to allow the user to mechanically induce an electrical/capacitive touch event on the touchscreen. Further to the foregoing exemplary embodiments of the invention, additional exemplary configurations of a viewer having an input mechanism, which is also referred to as the user input assembly, configured to induce a capacitive touch event that is detectable by a touchscreen based on mutual-capacitance are further described herein. It can be appreciated that the exemplary implementation described herein can be adapted to mechanically induce input events on a variety of types of touchscreens (e.g., resistive touchscreen events, touch events). Additional exemplary configurations of the viewer in accordance with the disclosed embodiments are further described herein in relation to FIGS. 7A-7F.

Figure 7A:
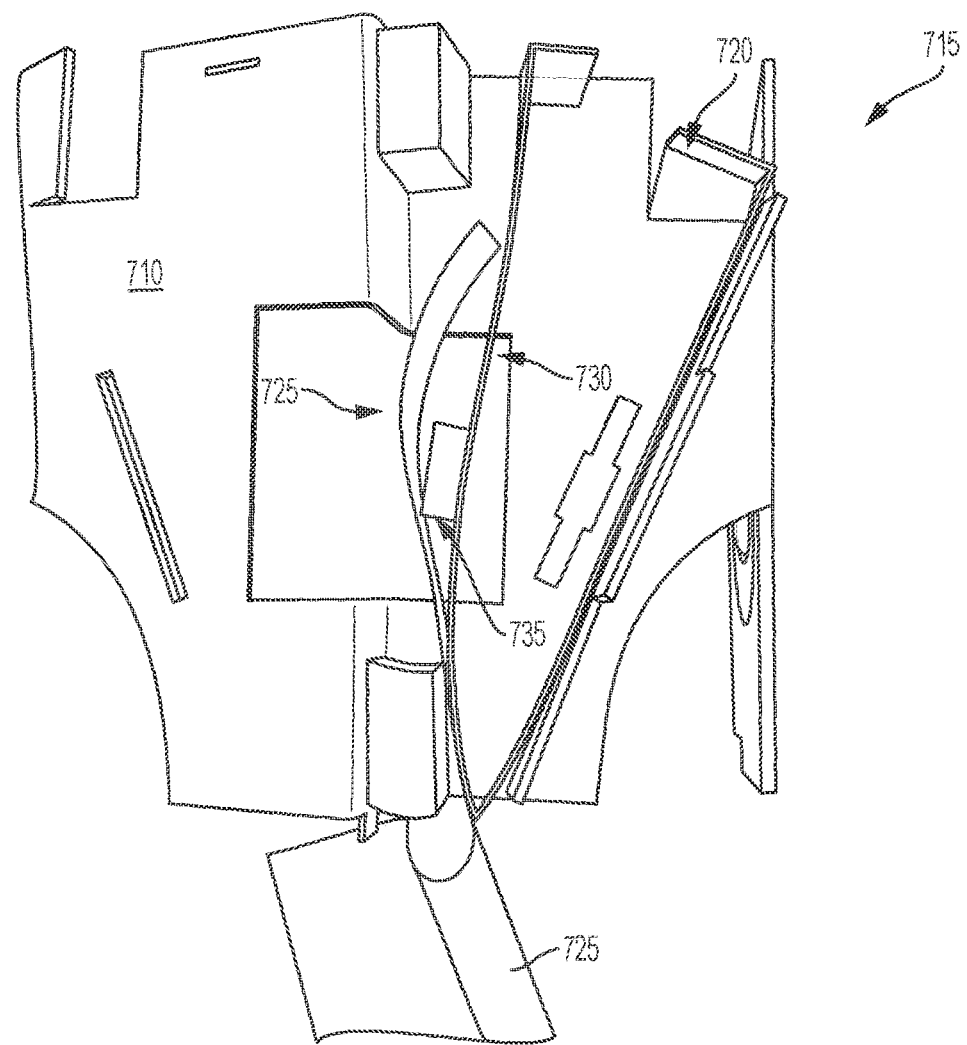
FIG. 7A illustrates an exemplary input mechanism for a virtual reality viewer in accordance with an embodiment of the invention.
Figure 7B:
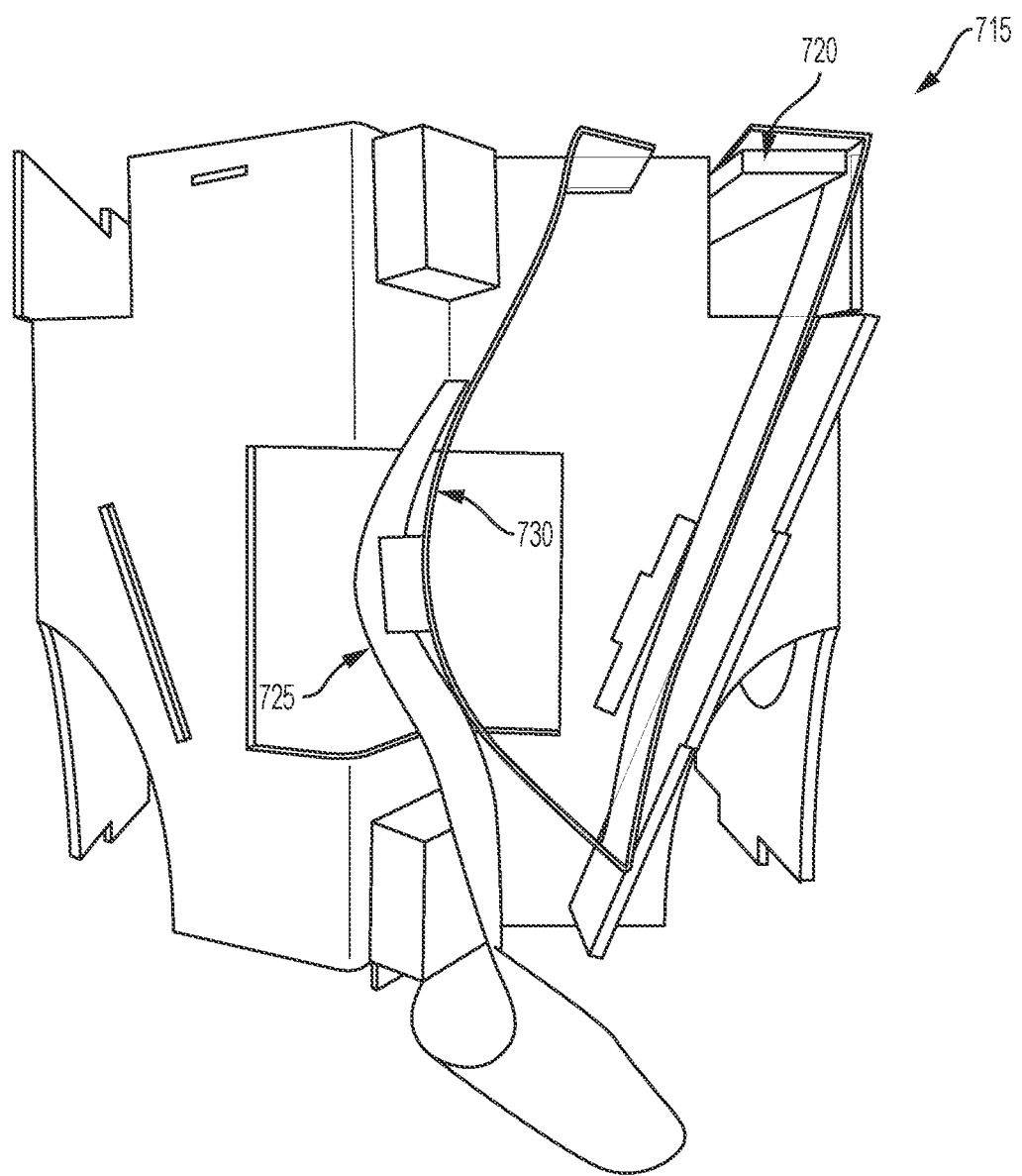
FIG. 7B illustrates the exemplary input mechanism for a virtual reality viewer of FIG. 7A.
Figure 7C:
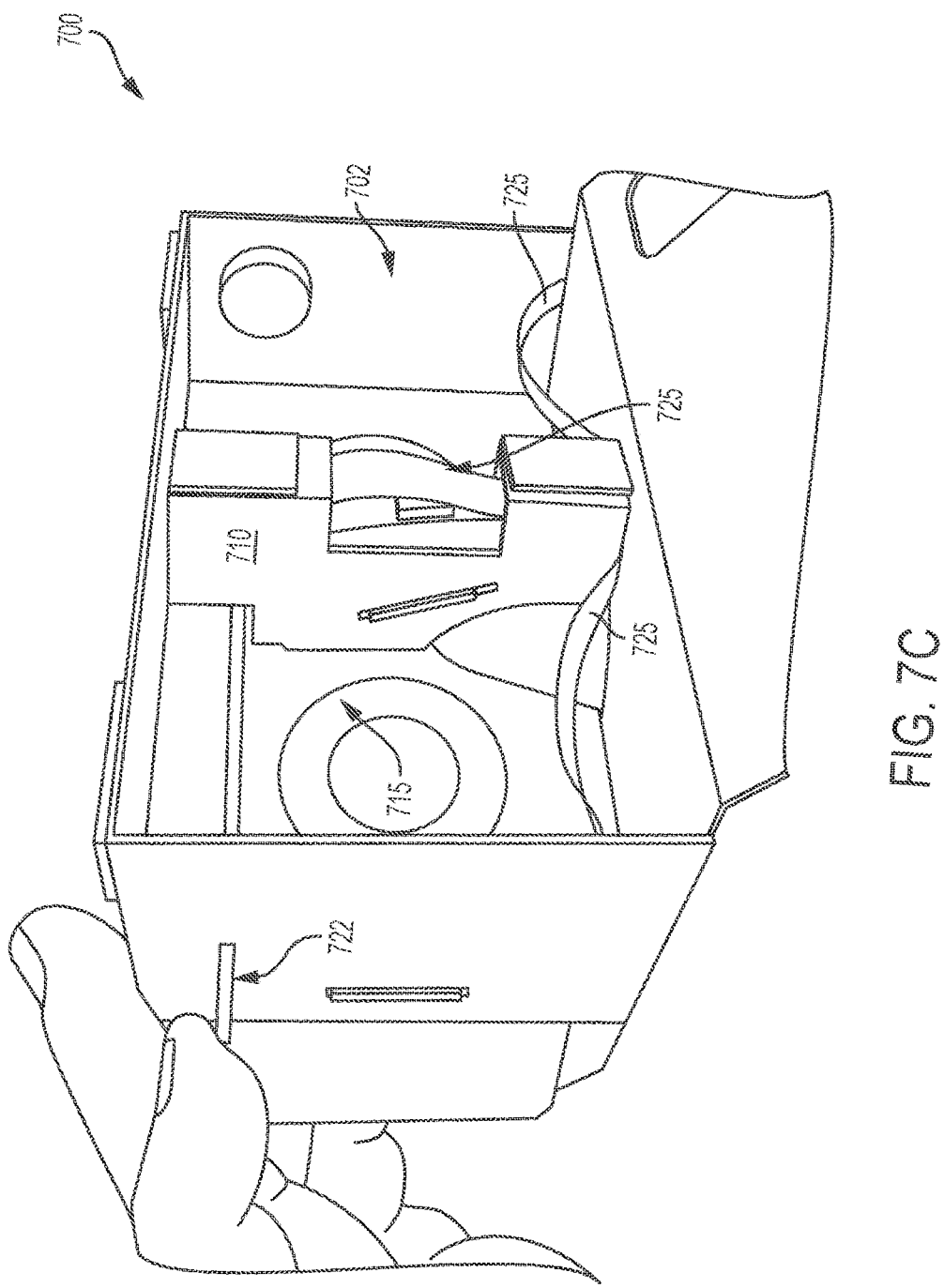
FIG. 7C illustrates an exemplary virtual reality viewer including the input mechanism of FIG. 7A.

FIG. 7C depicts a perspective view of a viewer 700 assembled and having a front side open showing the generally hollow interior of the viewer. Also shown is an input mechanism 715. The input mechanism is disposed within the interior 702 of the housing of the viewer 700. Moreover, at least a portion of the input mechanism is also accessible from the exterior of the viewer such that a user can interact with the input mechanism and cause the portion of the input mechanism contained within the housing to generate a touch input on the touch interface. More specifically, the input mechanism is moveable within the interior between at least a first position (also referred to as an unactuated state), in which a portion of the input mechanism is retracted so as to not contact a touchscreen of the mobile device, and an extended position (also referred to as the actuated state) in which a surface of the input mechanism contacts the touchscreen of the mobile electronic. As shown, at least a portion of the input mechanism is centrally located within the housing and defines at least a portion of a view divider 710. It should be appreciated that the housing and or one or more portions of the input mechanism further described herein can be comprised of a variety of materials such as plastics, metals, composites, woods and other heavy paper-like materials (e.g., cardboard) and or other such natural and synthetic materials.

FIG. 7A depicts the view divider 710 with one side of the view divider folded back so as to expose a portion of the user input mechanism 715 disposed within the interior of the viewer 700. The diagram also shows the user input mechanism 715 in an unactuated state.

As shown, FIG. 7A depicts a distal end 720 of a user input portion of the user input mechanism, which in this exemplary implementation is a lever. The proximal end (not shown) of the lever is accessible to a user from outside the viewer when assembled. The diagram depicts the input assembly 715 in an unactuated state. Also shown is an electrical shield 725. The electric shield is arranged such that at least a portion of the electric shield is configured to contact the touch-screen of the mobile electronic device when the input mechanism is in the extended position. The electrical shield is a material configured to, when brought in proximity to and/or touches the touchscreen, induce a touch event that is electrically detectable by the touchscreen/device. In some implementations, the electrical shield material can be a metallized textile/fabric or films, e.g., polymer film coated with a thin layer of metal, for example PET (Polyethylene terephthalate) films and Mylar (BoPET Biaxially-oriented polyethylene terephthalate). Such metalized materials are commonly used in anti-static bags. Moreover, the electrical shield can be comprised of other metallic conductors, non-metallic conductors, metallized fabrics, metallized polymers, conductive polymers, conductive fabrics, flexographic inks, rigid flex printed circuit board (PCB) and the like. As would be understood by those skilled in the art, such materials have electrical properties that, when a surface of the material is brought in proximity to a touchscreen and/or touches a touchscreen, can affect the electrical properties detected at that location by the touchscreen device. Other materials having the requisite electrical properties can also be used, for example, inks or pastes with carbon such as black flexographic inks having capacitive touch properties that are printed on substrates. Moreover, it can be appreciated that a combination of materials can be used to provide a surface of the input mechanism that is configured to induce a detectable touch input when the surface is touched to the touchscreen. For example, the electric shield can include a conductive polymer arranged to selectively contact the touchscreen and that is electrically coupled to a metallized fabric or conductive ink applied to a surface of the housing and/or input mechanism.

In some implementations, the electric shield is configured (e.g., sized and/or positioned) so as to have capacitive properties sufficient to be detected by a capacitive touchscreen when the input mechanism is in the extended position and in the absence of human contact with the electric shield. However, it can also be appreciated that, in some implementations, the electric shield can be electrically coupled to the portion of the input mechanism that is interacted with by the user such that electrical properties of the user's body can be utilized to induce the touch input.

Also shown is a coupling 730 that is configured to move the input mechanism towards the touchscreen when the lever is actuated. The coupling is a linkage that couples the portion of the input mechanism that is accessible to the user from the exterior (e.g., the proximal end of the lever) to the surface of the input mechanism configured to touch the touchscreen and induce a touch input. The coupling mechanically translates user actuation of the portion of the input mechanism from the exterior of the housing into movement of the input mechanism within the interior of the housing and causing a surface of the input mechanism to touch the touchscreen. For example, in the particular implementation shown in FIGS. 7A-7F, actuation of the lever causes the coupling to deform and extend in a direction towards the touchscreen, which in turn moves a portion of the electrical shield towards the touchscreen. Furthermore, as shown in FIG. 7A the coupling can be coupled to the housing. As can be appreciated, coupling one or more portions of the input mechanism to the housing can serve to support the input mechanism as well as guide the movement of the input mechanism during user actuation.

The coupling can be comprised of one or more flexible materials such as plastics, metals, composites, woods and other heavy paper-like materials (e.g., cardboard) and or other such natural and synthetic materials. A linkage or coupling that is flexible can be beneficial in that the material memory causes the coupling to return to a resting state when pressure is released from the lever which automatically pulls the input mechanism away from the touchscreen. However, alternative methods for automatically retracting the contact surface of the input mechanism can be similarly implemented without departing from the scope of the invention.

Although a particular exemplary linkage configuration is described in relation to FIGS. 7A-7F, it can be appreciated that other linkage configurations can be implemented without departing from the scope of the invention. It can also be appreciated that, although the lever, coupling and metallic shield have been described as individual components, the subject invention is not so limited as one or more of the foregoing components can be joined or integrally formed as single unit. Similarly, it can also be appreciated that one or more of the components of the input mechanism can be joined to the housing or integrally formed with the housing m a permanent or temporary fashion using any conventional manufacturing techniques.

In some implementations, a compressible pad 735, for example, a foam or foam-like material can be disposed between the flexible coupling and the electric shield. The pad can be placed between the flexible coupling and the electrical shield 725 in at least the location where the coupling contacts the metallic shield when extended (e.g., the back side of the electrical shield where the front side of the shield material contacts the touchscreen when extended). It can be appreciated that the electrical shield can be attached to the foam material or unattached. It can also be appreciated that the pad can be coupled to the coupling either directly or indirectly by one or more intermediate structures that comprise the input mechanism. The pad is used to create a sufficiently sized contact surface between the front side of the shield material and the touchscreen so as to register a touch input event on the screen (e.g., to simulate the size and shape of a finger). The pad also helps the surface of the input mechanism configured to touch the touchscreen (i.e., the shield material) conform to the touchscreen surface when the input mechanism is in the extended position/actuated state.

It can be appreciated that various sizes and shapes of the pad can be used to induce a sufficient sized contact surface. It can also be appreciated that in some implementations the pad can be omitted. It can also be appreciated that the metallic shield and pad may be integrated or combined into a single material such as conductive foam gaskets used in Electromagnetic Interference (EMI) or Radio Frequency Interference (RFI) applications. It can also be appreciated that the pad can be sized and/or shaped such that actuating the input mechanism with greater force causes a greater surface area of the electrical shield to be applied to the screen which can be interpreted differently by the device than when a smaller surface area is detected by the touchscreen. This input mechanism configuration can be used to provide a secondary signal for detecting the amplitude of the users input, for example a method for detecting the amount of force the user applied to the input.

A portion of the lever can be attached to or in communication with (i.e., touching) or integrally formed to at least a portion of the coupling. For instance, as shown, the distal end of the lever can be abutting a portion of the coupling such that, when the lever is actuated at a proximal end, movement of the distal end of the lever causes the plastic coupling to buckle and at least a portion of the coupling extends in the direction towards the touchscreen. In addition or alternatively, the coupling can be a structure that is flexibly coupled to one or more portions of the housing such that it moves in a prescribed manner when a lever is moved or a button is pushed by the user.

FIG. 7A depicts the view divider 710 with one side of the view divider folded back so as to expose the user input assembly 715 disposed within the view divider of the viewer 700. The diagram also shows the user input assembly 715 in an unactuated state.

FIG. 7B depicts the view divider 710 with one side of the view divider folded back so as to expose the user input assembly 715 disposed within the view divider of the viewer 700. The diagram also shows the user input assembly 715 in an actuated state.

FIG. 7C depicts a perspective view of the viewer 700 assembled and showing the view divider 710 and showing at least a portion of the user input assembly 715 disposed within the interior of the housing 700. The diagram also shows the user input assembly 715 in an unactuated state. As shown, the user input (lever) includes a proximal end portion 722 that extends through a cut-cut in the housing of the viewer 700 and is accordingly accessible to the user from the exterior of the housing. It can be appreciated that alternative configurations in which one or more portions of the lever or other such mechanical actuators or portions of the input mechanism is accessible from the exterior of the viewer are envisioned. For instance, the lever can be contained within the interior of the housing and accessible to the user through a cut-out through an external wall of the housing.

Figure 7D:
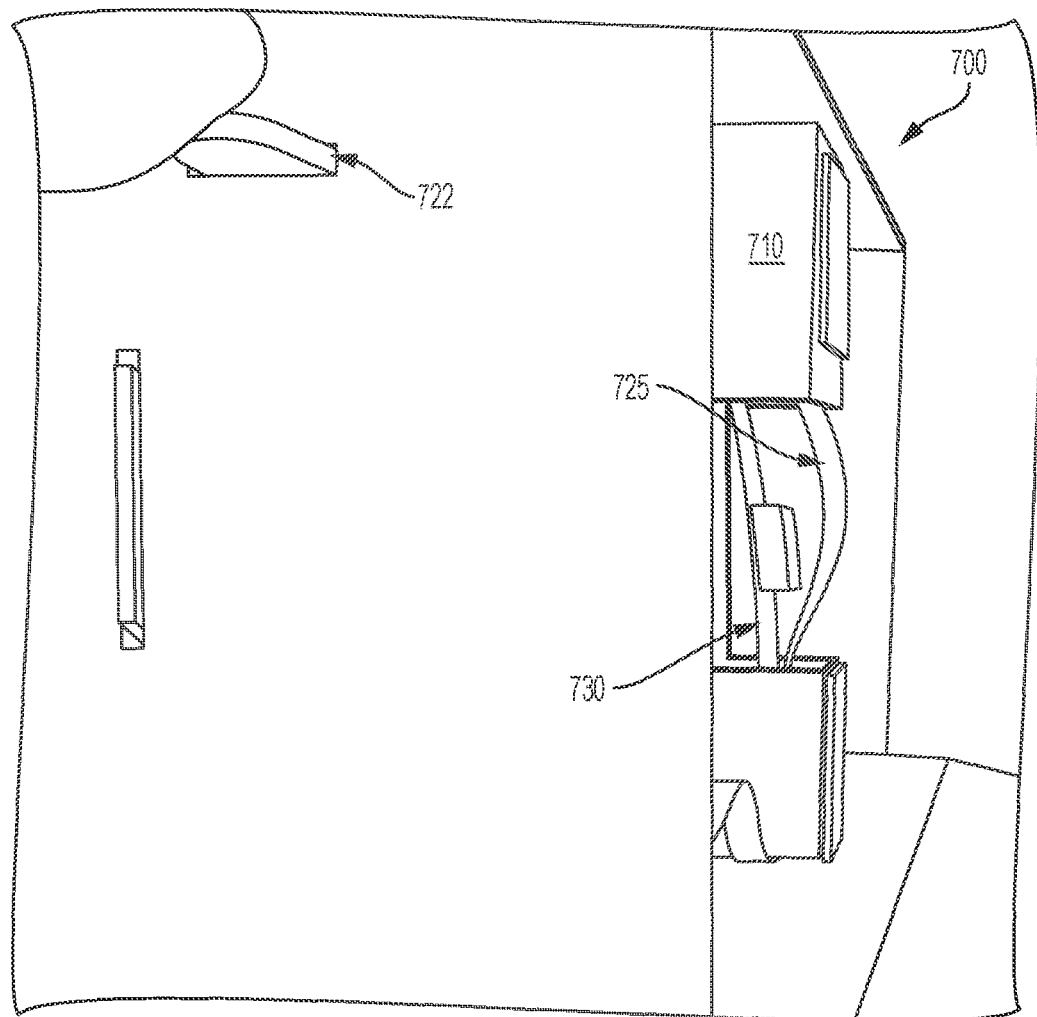
FIG. 7D illustrates the exemplary viewer and input mechanism of FIG. 7C.

FIG. 7D depicts a side view of the viewer 700 assembled and showing the view divider 710 and showing at least a portion of the user input assembly 715 disposed within the interior of the viewer housing 700. The figure also shows the user input assembly 715 in an unactuated state.

Figure 7E:
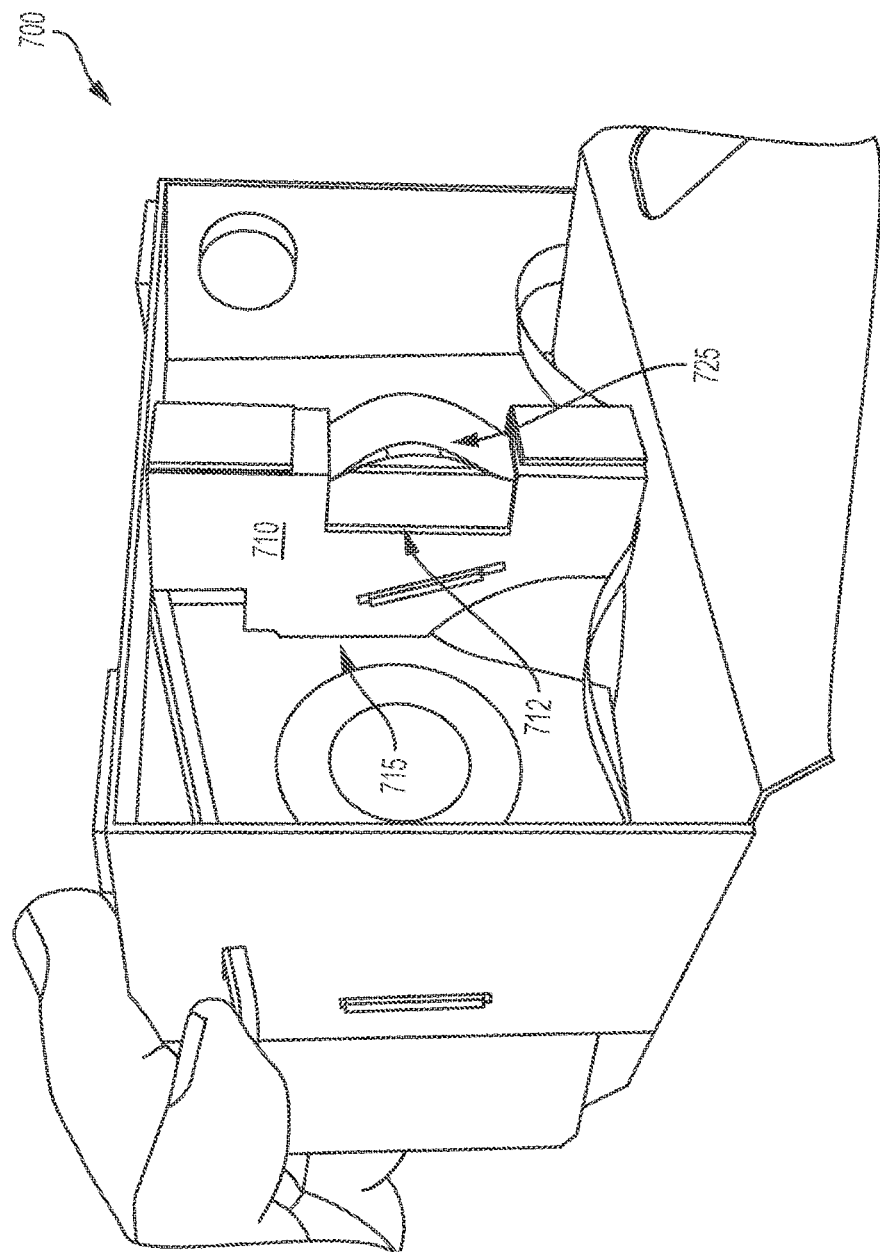
FIG. 7E illustrates the exemplary viewer and input mechanism of FIG. 7C.

FIG. 7E depicts a perspective view of the viewer 700 assembled and showing the view divider 710 and showing at least a portion of the user input assembly 715 disposed within the interior of the viewer housing 700. The diagram also shows the user input assembly 715 in an actuated state where the electrical shield is extended out of the cut-out in the view divider.

Figure 7F:
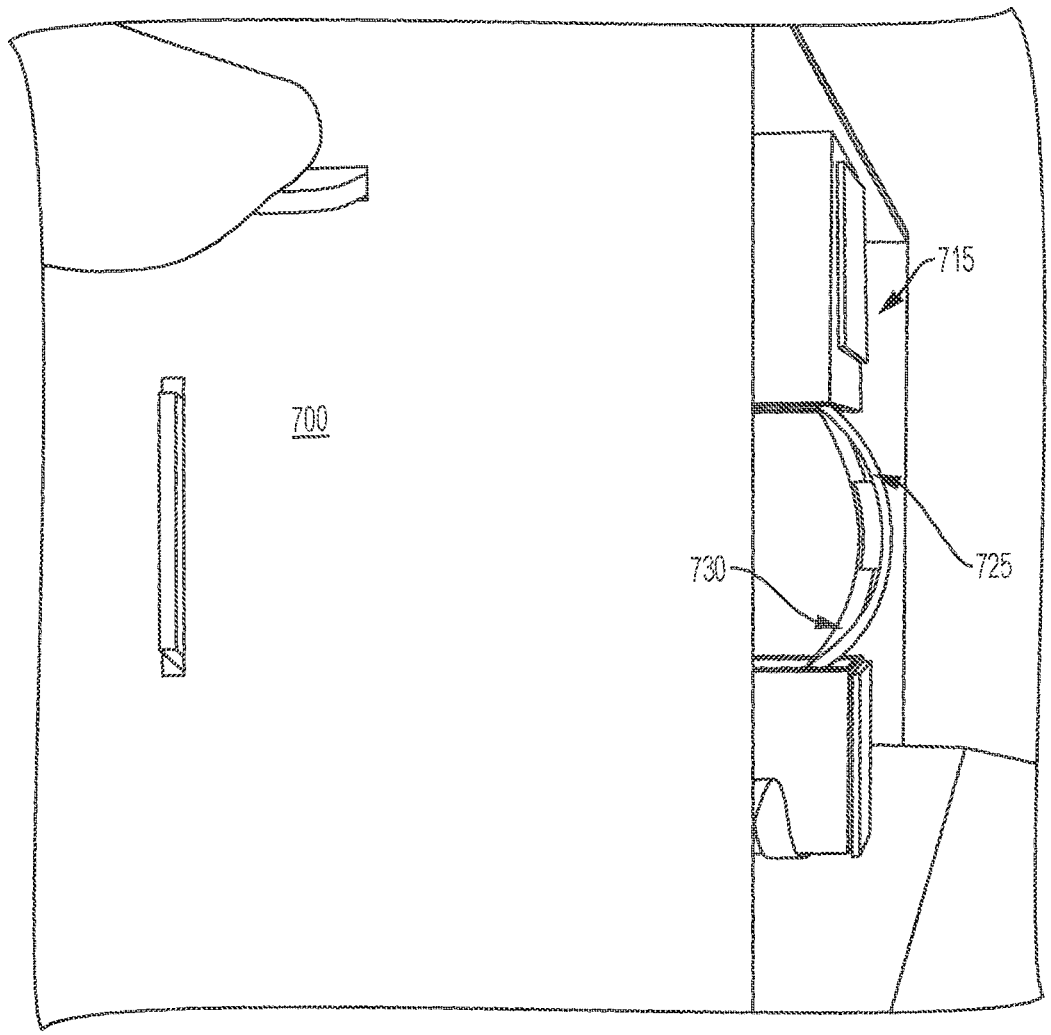
FIG. 7F illustrates the exemplary viewer and input mechanism of FIG. 7C.

FIG. 7F depicts a side view of the viewer 700 assembled and showing the view divider 710 and showing at least a portion of the user input assembly 715 disposed within the interior of the viewer 700. The diagram also shows the user input assembly 715 in an actuated state where the electrical shield is extended out of the cut-out 712 in the view divider.

When a user device is placed within the viewer, such that the touchscreen is facing the interior of the viewer and near the view divider, actuating the user input assembly by actuating the lever can cause the coupling to flex and therefore cause the electrical shield to extend towards and touch the touchscreen of the user device. In this exemplary implementation, the coupling and shield extend out of a cut-out in the view divider. As a result, the device can detect the change in an electrical property at one or more locations of the screen, which is caused by the electrical shield touching (or approaching) the touch-sensitive display.

Accordingly, it can be appreciated that, what is provided is a virtual reality viewer for use with an electronic touchscreen device comprising a housing for receiving and holding a touchscreen display device within an interior region of the housing. The viewer further comprising an input mechanism that is accessible from an exterior of the housing and is moveable within the interior between at least a first position and an extended position, wherein a surface of the input mechanism is configured to contact the touch-screen of the mobile electronic device when in the extended position. In one particular implementation, the input mechanism comprises a lever having a proximal end that is exposed to the exterior of the housing and a distal end disposed within the housing, whereby the proximal end of the lever is accessible by a user from the exterior of the housing and actuation (e.g., movement) of the lever at the proximal end translates to mechanical movement of the distal end. The viewer further comprising a coupling attached to or in communication with the distal end of the lever such that, when the lever is actuated at the proximal end, movement of the lever causes at least a portion of the coupling to move toward a back wall of the housing, e.g., extend or move in a direction of the touchscreen. The viewer further comprises an electrical shield, wherein the electrical shield is a material configured to induce a touch event that is electrically detectable by a touchscreen/device when at least a portion of the shield contacts or is in proximity to a touchscreen. In addition, the portion of the electrical shield is positioned between the coupling and the touchscreen such that movement of the coupling advances at least the portion of the electrical shield material toward the touchscreen so as to induce the touch event. Moreover, the viewer can further comprise a compressible pad disposed between the portion of the coupling and the electrical shield, wherein the pad is attached to the coupling and is sized, shaped and has the softness/rigidness to create a sufficiently sized contact point for generating a touchscreen detection event on the touchscreen device. The compressible pad and electrical shield material work to mimic the electrical and physical properties of a human finger so that any form of touch screen technology will register a touch event when the lever mechanism is actuated. As would be understood by those skilled in the art the combination of physical, and electrical properties of this pad electrical shield material can be tuned to work on a variety of touch screen technologies such as capacitive, resistive, or conductive touch screen technologies. As previously noted, in some implementations, one or more components of the exemplary user input assembly can be integrated into or part of the view divider.

According to a salient aspect, the viewer and the exemplary electro-mechanical user input assembly is configured to allow a user to interact with the touch sensitive screen without access to the touch sensitive screen while within the viewer. Moreover, the exemplary viewer and user input assembly can be configured to allow a user to interact with the touch sensitive screen without reliance on the electrical properties of the human body to induce the electrical event. For instance, the metallized film 725 can be sized such that it is suitable for inducing a touch event without requiring user contact therewith. In addition or alternatively, the portion of the metallized film that is configured to touch the screen can be accessible to receiving a user touch. For instance, a portion of the metallized film can be exposed on the lever 722 or otherwise accessible to the user on an external surface.

As would be understood by those skilled in the art, the mobile electronic device, which has a processor executing instructions in the form of code, can detect that electrical property change at the one or more locations and interpret the change as one or more prescribed user interactions. In some implementations, the user interaction can be interpreted as a simple click event. In some implementations, a variety of possible user interactions can be detected as a function of the location of the touch event on the touchscreen (e.g., as caused by different input mechanisms configured to cause touch inputs at respective locations on the touchscreen), the duration of the touch event, the size of the area of the touchscreen registering the touch event, and the like. These detected aspects of the touch event can be interpreted and translated into one or more prescribed input instructions, for example, a left mouse click or a right mouse click, a double click, or as the user moving a cursor, a virtual gesture such as a grab, push, pull, throw, pinch or as a scaled input instruction such as a hold softly or hold firmly or other such functions.

Moreover, user interactions detected by the touch sensitive display can be interpreted in combination with one or more other input devices. More specifically, a user interaction detected can be interpreted in light of other input data received by the user device from other on-board input devices or data sources, for example and without limitation, an accelerometer that detects the orientation and location of the device or a camera or 3d scanner that detects the physical environment of the user or portions of the user's body position. In addition, the housing can also include one or more additional user input devices electrically coupled to the mobile device by a wireless or wired connection, such that inputs via the electro-mechanical input mechanism can be provided to the mobile device in addition to inputs provided using the additional input device. For example, based on the orientation and location of the device and the information being viewed by the user on the device, the device can determine that a user is looking at an interactive virtual icon using the viewer. Paired with the user actuation of the user input mechanism and the detection of a touch input, the device can interpret the combined user input (e.g. accelerometer data and the touch interaction data) as a "mouse click" on that particular virtual icon or as a grab or hold of that virtual item or icon. Another example might be combining the accelerometer data for device position, camera data from the device capturing the user's physical environment, and a touch event from the mechanism described in this invention in a way that allows the user to select a real physical item to scan/import into a virtual or augmented reality interface allowing for the digital manipulation of the physical item or overlaying additional information about the physical item.

It can also be appreciated that the user input mechanism can be adapted to induce user interactions at a variety of different locations or multiple user input assemblies can be provided to facilitate more complex user inputs.

It is to be understood that like numerals in the drawings represent like elements through the several figures, and that not all components and/or steps described and illustrated with reference to the figures are required for all embodiments or arrangements.

The subject matter described above is provided by way of illustration only and should not be construed as limiting. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, as set forth in each and any of the following claims.

The invention claimed is:

1. A virtual reality viewer for use with a mobile electronic device having a touchscreen, the viewer comprising:
   a first lens and a second lens, wherein the first lens is facing the same direction as the second lens, and wherein the first lens and the second lens are spaced apart in a horizontal direction;
   a foldable cardboard enclosure having a first side and a second side opposite the first side, the first side configured to hold the first lens and the second lens, the second side configured to receive the mobile electronic device;
   a touchscreen input constructed of conductive material, wherein the touchscreen input is in physical contact with the touchscreen upon receipt of the mobile electronic device, wherein the touchscreen input is responsive to a depressible button user input device that is accessible from an exterior of the enclosure.

* * * * *